United States Patent [19]

Scott

[11] 4,212,421
[45] Jul. 15, 1980

[54] RETRIEVAL AND STORAGE DEVICE FOR FLEXIBLE ELEMENTS

[76] Inventor: Robert F. Scott, P.O. Box 1442, Terre Haute, Ind. 47808

[21] Appl. No.: 865,741

[22] Filed: Dec. 29, 1977

[51] Int. Cl.$^2$ ............................................. B65H 17/26
[52] U.S. Cl. .................... 226/127; 226/181; 226/190; 137/355.2; 191/12 R; 254/312
[58] Field of Search ............... 226/181, 182, 188, 189, 226/200, 186, 187, 190, 127; 254/175.3, 175.5, 175.7, 138, 167; 191/12, 12.2, 12.4; 74/219, 226, 227; 137/355.16, 355.2

[56] References Cited

U.S. PATENT DOCUMENTS

| | | | |
|---|---|---|---|
| 1,640,623 | 8/1927 | Stein | 74/219 |
| 1,865,069 | 6/1932 | Allen | 254/175.5 |
| 2,340,440 | 2/1944 | Swann | 191/12 R |
| 2,856,470 | 10/1958 | Hyde | 191/12.4 |
| 3,239,120 | 3/1966 | Bosteels | 226/188 |
| 3,700,152 | 10/1972 | Warren | 226/181 |

FOREIGN PATENT DOCUMENTS 86187  4/1936  Sweden .................... 254/175.5

Primary Examiner—H. Grant Skaggs
Attorney, Agent, or Firm—Jenkins, Coffey, Hyland, Badger & Conard

[57] ABSTRACT

An apparatus for retrieving and storing an elongated flexible element such as an electrical cord, garden hose, air hose, vacuum hose, rope, or the like. The elongated flexible element has a first end for attachment to a service and a second end for attachment to an article to be coupled through the elongated member to the service. The apparatus includes first and second wheels, a framework for supporting the wheels in a use orientation, with peripheral surfaces of the wheels in closely spaced-apart relation. The supporting framework supports the wheels for rotation about their respective axes, the axes extending generally parallel to one another. The space between the wheel peripheries is sufficiently small when the wheels are in the use orientation that the wheel peripheries bear frictionally upon the surfaces of the flexible element to move the flexible element therebetween as the wheels are turned. One of the wheels is turned to retrieve the flexible element. A storage hopper is attached to the support framework for storing the retrieved flexible element.

2 Claims, 12 Drawing Figures

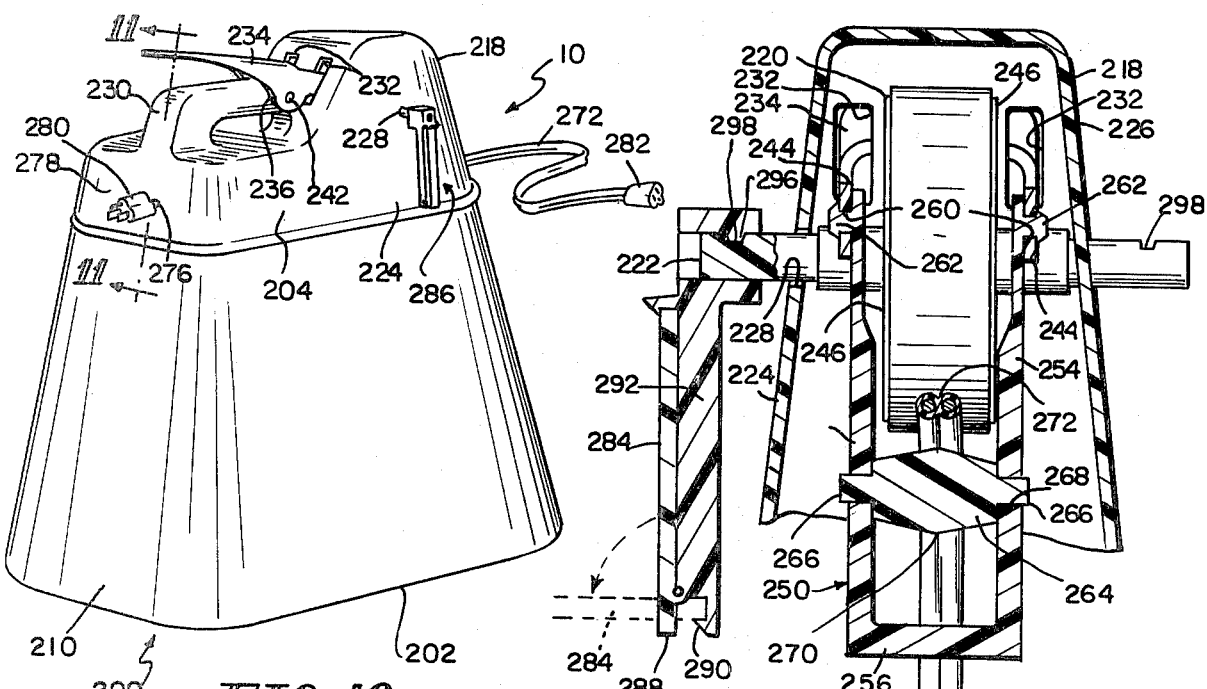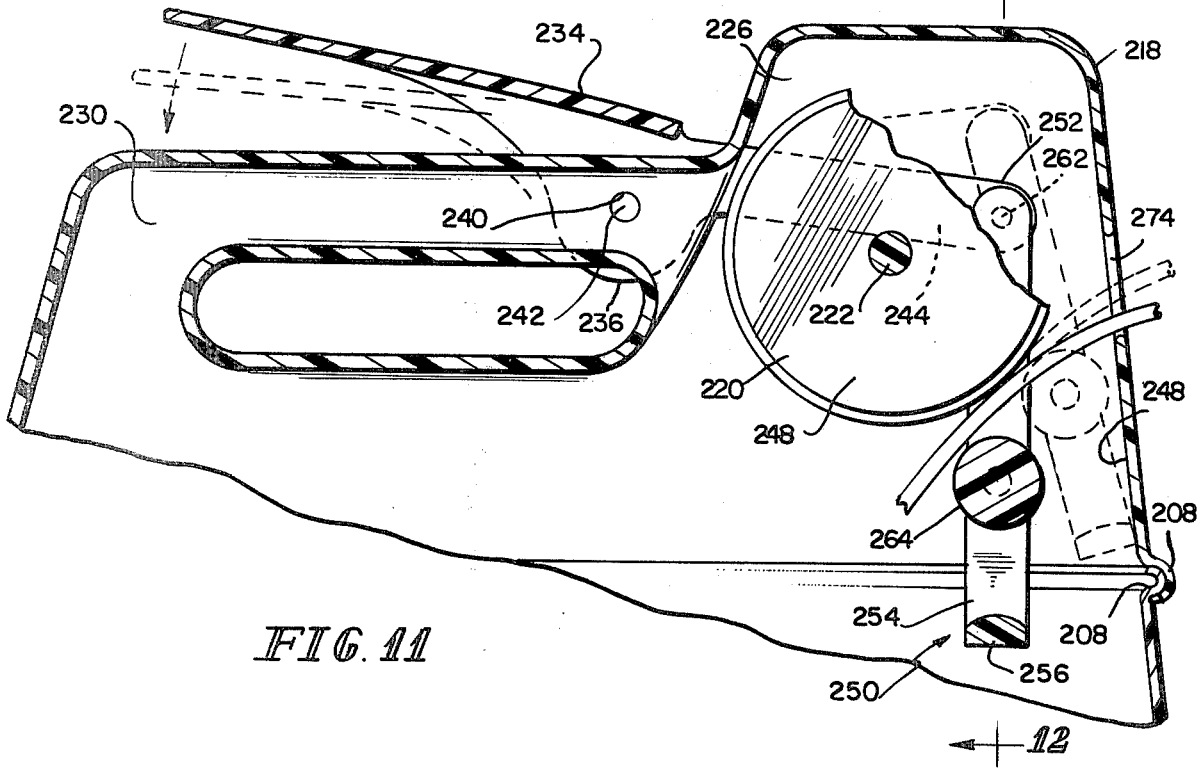

RETRIEVAL AND STORAGE DEVICE FOR FLEXIBLE ELEMENTS

This invention relates to apparatus for retrieving and storing flexible elements. The apparatus is particularly useful for retrieving and storing flexible elements having first and second ends, respectively, for attachment to a service and to an article to be coupled to the service through the flexible element.

There are several well-known types of storage apparatus and retrieval apparatus for elongated flexible elements, such as electrical cords and water hoses. See, for example, the following U.S. patents: Hyde, U.S. Pat. No. 2,856,470; Bernard Jr., U.S. Pat. No. 3,106,366; Hagstrom, U.S. Pat. No. 3,837,448; and, Knarreborg, U.S. Pat. No. 3,876,045.

The devices of known prior art flexible element retrieval and storage mechanisms usually include a built-in flexible element, since the flexible element must be especially constructed for use with the retrieval and storage system. For example, devices of the types illustrated in the aforementioned patents generally require a rotary electrical connection between some part of the retrieval and storage apparatus and the flexible electrical cord to be retrieved and stored thereon. Under certain circumstances, a portion of the retrieval and storage apparatus itself will be "hot", i.e., not isolated from one of the conductors of the electrical supply. This is a particularly undesirable characteristic in view of certain occupational safey considerations.

It is an object of the present invention to provide a retrieval and storage assembly which is useful with conventional elongated flexible elements, such as ordinary electrical cords, water hoses, air hoses, vacuum hoses, rope, and the like.

A further object of the present invention is to provide a retrieval and storage assembly which does not require a rotary connection between the elongated flexible member and a service to which one end of the elongated flexible member is to be coupled.

According to one embodiment of the invention, an apparatus is provided for retrieving a flexible element having a first end for attachment to a service, such as an electrical service, a source of water, air, etc., and a second end for attachment to an article, such as an electrical appliance, or a water hose nozzle, to be coupled through the elongated member to the service. The retrieving means includes a pair of wheels mounted for rotation about their respective axes, the axes extending generally parallel to one another, means for supporting the wheels in a use orientation with their peripheries in closely spaced-apart relation for rotation about their axes, the space between the wheel peripheries being sufficiently small that they bear frictionally upon the surfaces of the elongated member to move the elongated member therebetween as the wheels are turned, and means for turning at least a first one of the wheels in a direction to cause retrieval of the elongated member.

According to an illustrative embodiment of the present invention, the retrieval means are attached to storage means so that the flexible element is stored in the storage means as it is retrieved.

Further according to an illustrative embodiment, the means for turning one of the wheels comprises a hand-manipulated crank attached to one of the wheels to turn it on its axis.

Additionally, according to an illustrative embodiment, the turning means further includes means for turning the other wheel in the opposite direction, turning of the two wheels in opposite directions drawing the flexible element between the adjacent surfaces thereof as the flexible element is retrieved. Illustratively, the means for turning the other wheel comprises pulleys coupled to both wheels and a flexible belt trained about the two pulleys, the runs of the belt between the two pulleys crossing to provide the driving connectin between the first wheel and the other wheel to turn them in opposite directions.

According to an illustrative embodiment, the support means includes means for shifting at least one of the wheels from the use orientation to a slip-providing orientation in which the frictional engagement between the peripheries of the wheels and the flexible element is released to provide for withdrawal of the flexible element from the storage means between the adjacent wheel peripheries. Illustratively, the shifting means comprises a shiftable support member for movably mounting at least one of the wheels, a spring for urging the last-mentioned wheel to the use orientation, the spring acting between the shiftable support member and a stationary part of the support means, and a lever for controlling movement of the shiftable support member from the use orientation to the slip-providing orientation.

Further, according to an illustrative embodiment, the storage means includes means defining an opening through which the first end of the flexible element is accessible for attachment to the service.

The invention may best be understood by referring to the following description and accompanying drawings which illustrate the invention. In the drawings:

FIG. 10 is an isometric view of another device constructed according to the present invention;

FIG. 11 is a fragmentary sectional view taken generally along section lines 11—11 of FIG. 10; and, FIG. 12 is a fragmentary sectional view taken generally along section lines 12—12 of FIG. 11.

Figure 1:
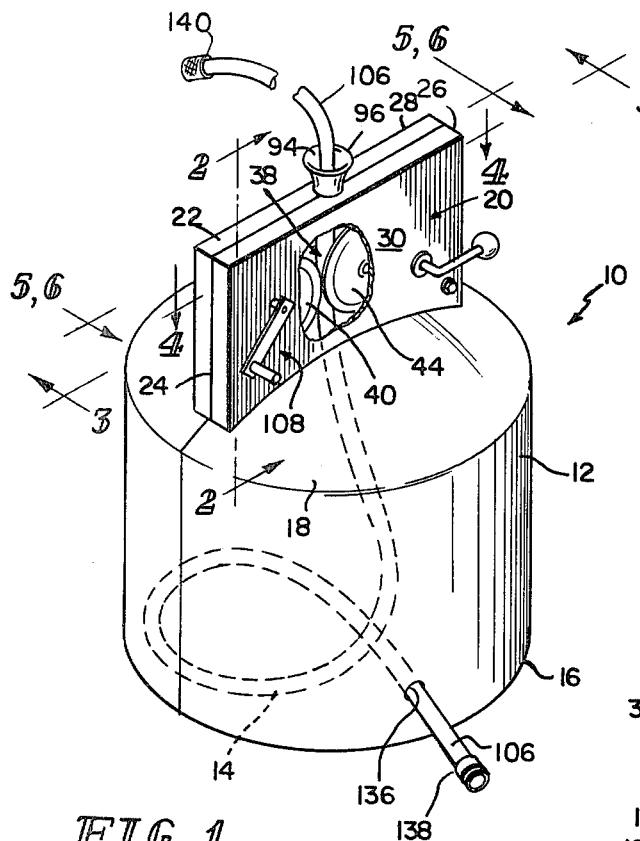
FIG. 1 is a partly fragmentary isometric view of a device constructed according to the present invention.

Referring now particularly to FIGS. 1-6, an apparatus 10 constructed according to the invention includes a generally right circular cylindrical storage hopper 12 having a bottom 14, a side wall 16, and a slightly domed or pent top 18. Top 18 supports a retrieval mechanism support housing 20 having a generally rectangular top wall 22, end walls 24, 26 and side walls 28, 30. Top 18 has a generally diametrically extending slot 32 which connects the storage hopper 12 to the retriever mechanism support housing 20. The illustrative storage hopper 12 and support housing 20 are formed in two vertical halves, with half of the storage hopper being formed jointly with a respective half of the retrieval mechanism support housing 20.

Support housing 20 houses a retrieval mechanism 38 including a wheel 40 rotatably supported upon an axle 42 and a wheel 44 rotatably supported from an axle 46. The ends 48, 50 (FIG. 2) of axle 42 extend through the side walls 28, 30 of housing 20 to support wheel 40. One end 52 (FIG. 4) of axle 46 is attached to the distal end 54 of a shiftable support lever 56. A proximal end 58 of support lever 56 is pivotally attached, as at 60, to side wall 30 of support housing 20. A coil spring 62 is attached at one end thereof to the distal end 54 of lever 56, and at the other end thereof to a point 64 in the upper middle of side wall 30. Coil spring 62 normally urges the periphery 66 of wheel 44 toward the periphery 68 of wheel 40.

An opening 74 is provided in side wall 30 near the bottom thereof adjacent pivot point 60. Opening 74 is provided with a bushing 76 which pivotally supports a proximal end 78 of a cam lever 80. The distal end of cam lever 80 is provided with a knob 82. Proximal end 78 of cam lever 80 extends through the bushing 76 into the interior of support housing 20 adjacent an edge 84 of support lever 56. The proximal end 78 of cam lever 80 is formed to provide a cam 86 having a generally right circular cylindrical surface 88 (see FIGS. 5,6) with a flat 90 provided therein. Hand manipulation of cam lever 80 to the position illustrated in FIGS. 3, 6 results in engagement of the peripheries 66, 68 of wheels 44, 40, respectively, with one another. Manipulation of cam lever 80 to the position illustrated in FIGS. 4, 5 results in disengagement of the peripheries 66, 68 of wheels 44, 40, respectively, from one another.

Figure 4:
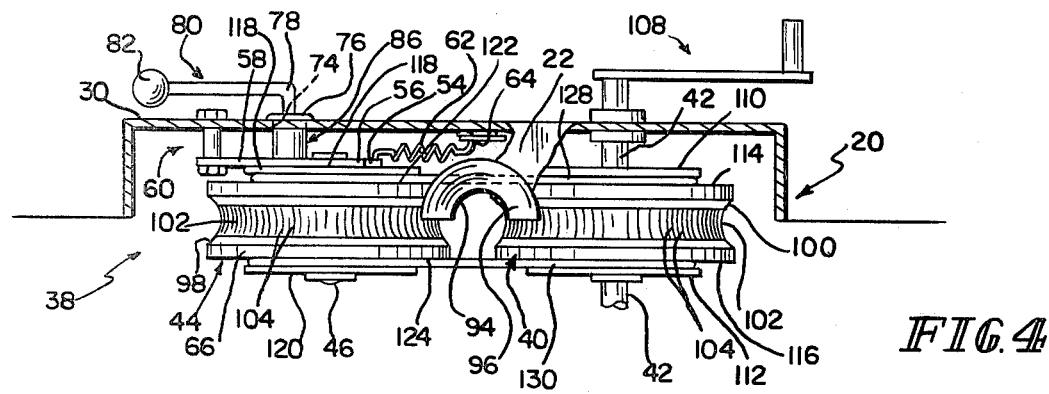
FIG. 4 is a fragementary sectional view of the apparatus of FIG. 1 taken generally along section lines 4—4 thereof.
Figure 5:
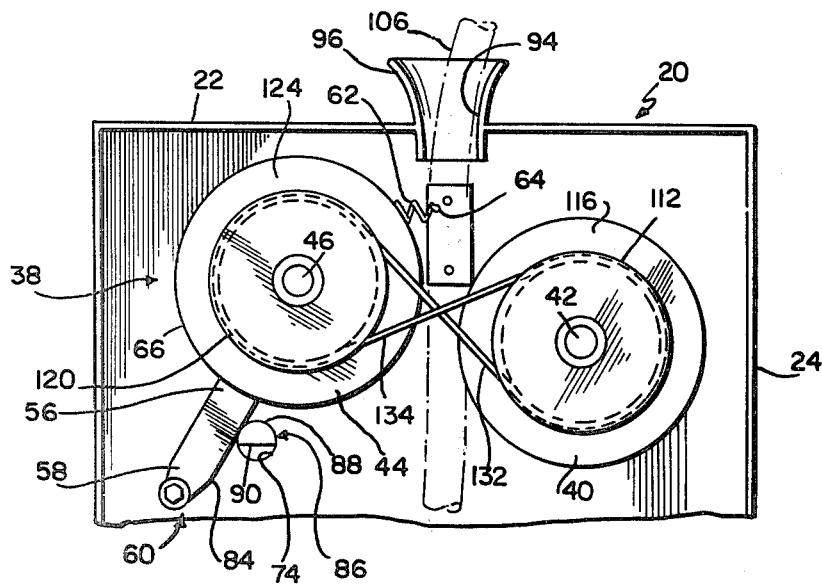
FIGS. 5-6 are fragmentary sectional views of the apparatus of FIG. 1 taken generally along section lines 5,6—5,6 of FIG. 1.
Figure 6:
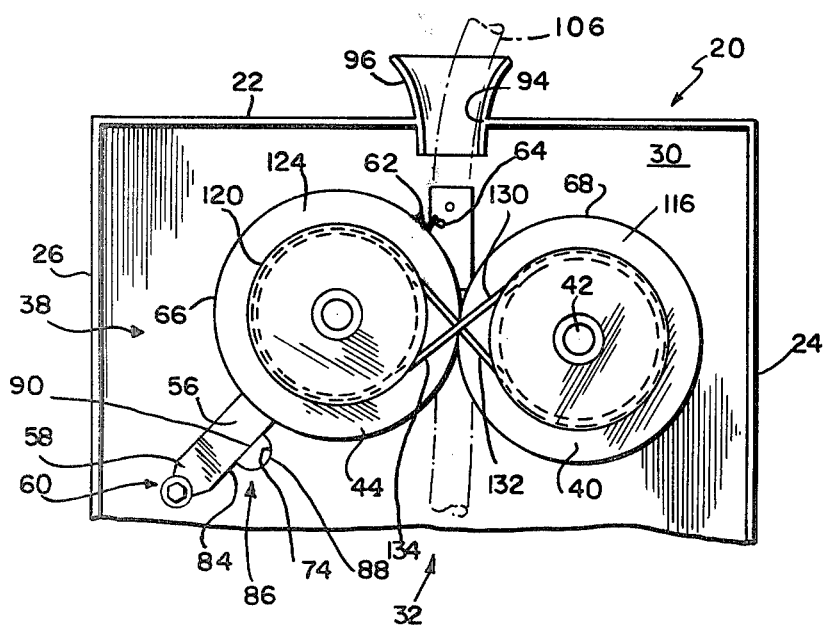

An opening 94 provided in top wall 22 of the support housing 20 is surrounded by a reinforcing and strain-relieving collar 96. Opening 94 is located substantially vertically above the line of intersection of the peripheries 66, 68 of wheels 44, 40, respectively, as illustrated in FIG. 6. The peripheries 66, 68 of wheels 44, 40, respectively, are provided with concave, generally semicircle annular grooves 98, 100, respectively (FIGS. 2,4). The bottoms 102 of grooves 98, 100 are serrated, knurled, axially grooved, or otherwise roughened, as illustrated at 104, to improve the grip of bottoms 102 on an elongated flexible element 106 (illustrated in broken lines in FIGS. 1, 2, 5, and 6), such as a water hose.

Means, such as a hand crank 108, is attached to the axle 42 of wheel 40. Cranking action on hand crank 108 rotates wheel 40. When cam lever 80 is in its position illustrated in FIGS. 3, 6, coil spring 62 urges the peripheries 66, 68 of wheels 44, 40, respectively, together, capturing the elongated flexible element 106 therebetween. Friction between the bottoms 102 of wheels 40, 44 and the surface of the elongated flexible element 106 causes flexible element 106 to be fed outwardly (upwardly) through opening 94 as hand crank 108 is rotated in one direction (counterclockwise in FIG. 3), and causes flexible element 106 to be fed downwardly through opening 94 (retrieved) into the storage hopper 12 when hand crank 108 is rotated in the other direction (clockwise in FIG. 3).

To aid the retrieval of the elongated flexible element 106 into storage hopper 12, wheel 40 is provided with pulleys 110, 112 on the two axially oppositely facing sides 114, 116, respectively thereof. Wheel 44 is provided with pullys 118, 120, on the two axially oppositely facing sides 122, 124, respectively thereof. Flexible belts 128, 130 are trained about pulleys 110, 118 and 112, 120, respectively. The runs 132, 134 of each belt 128, 130 cross each other to provide rotation of wheels 40, 44 in opposite directions, whether or not their peripheries 66, 68 are touching one another.

Figure 2:
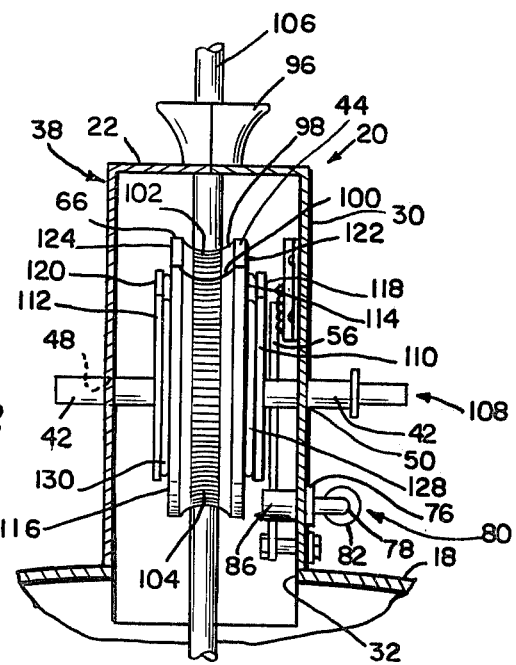
FIG. 2 is a fragmentary sectional view of the apparatus of FIG. 1 taken generally along section lines 2—2 thereof.
Figure 3:
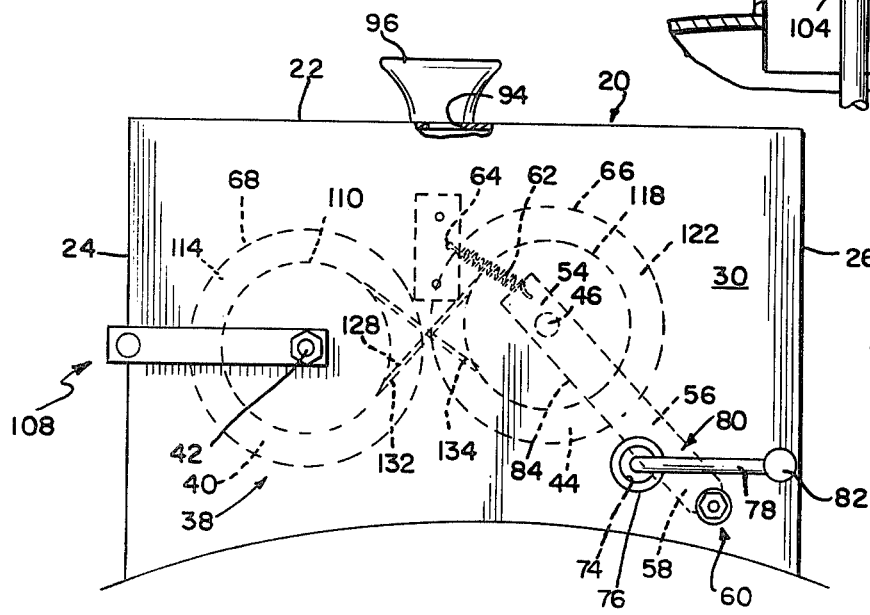
FIG. 3 is a fragmentary sectional side elevational view of the apparatus of FIG. 1, taken generally along section lines 3—3 thereof.

Referring now to FIG. 1, an opening 136 is provided in the side wall 16 of storage hopper 12 adjacent the bottom 14 thereof. Opening 136 provides access to a first end 138 of the elongated flexible element 106, such that end 138 can be attached to a service, such as a water spigot (not shown). The second end 140 of elongated flexible element 106 can be coupled to a water spray nozzle or the like (not shown). The generally circular or oval cross section of elongated flexible element 106 provides good contact between the flexible element surfaces and the bottoms 102 of annular grooves 98, 100. As the elongated flexible element 106 is retrieved by the retrieval mechanism 38 of the embodiment of FIGS. 1-6, it will form a generally helical coil in storage hopper 12. Since flexible element 106 is fed generally freely and without twisting into hopper 12, it can be removed from the hopper without tangling or knotting by moving cam lever 80 to the position illustrated in FIGS. 4, 5 and pulling the elongated flexible element 106 from the storage hopper 12 through opening 94.

It should be noted that in this embodiment, no special or complex rotary connection of the service through the elongated flexible element 106 or from the flexible element 106 to the device attached to the second end 140 thereof is necessary. In the water hose retrieval and storage mechanism, an ordinary water hose can be used with no special adapter apparatus for rotary attachment of the water hose to a water spigot.

Figure 7:
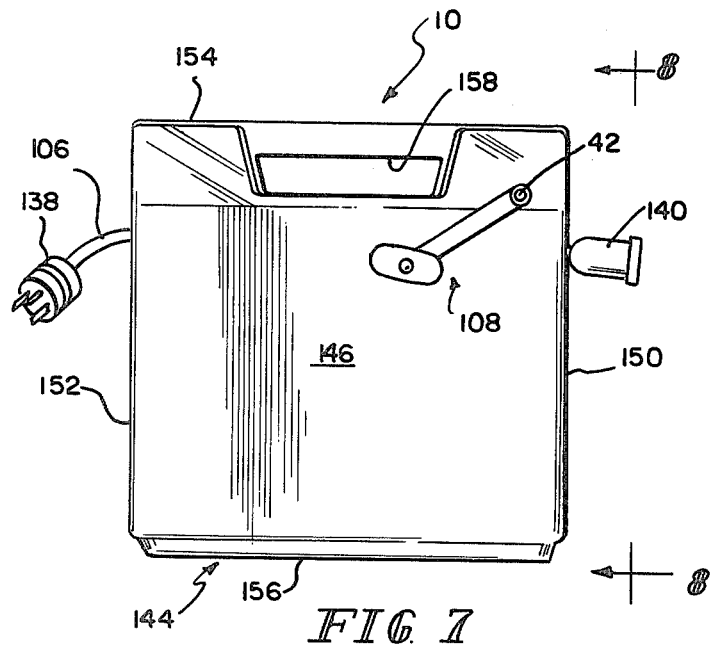
FIG. 7 is a side elevational view of another device constructed according to the present invention.
Figure 8:
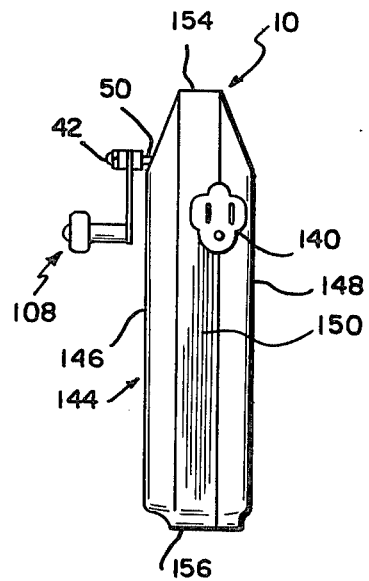
FIG. 8 is an end elevational view of the apparatus of FIG. 7 taken generally along section lines 8—8 thereof.
Figure 9:
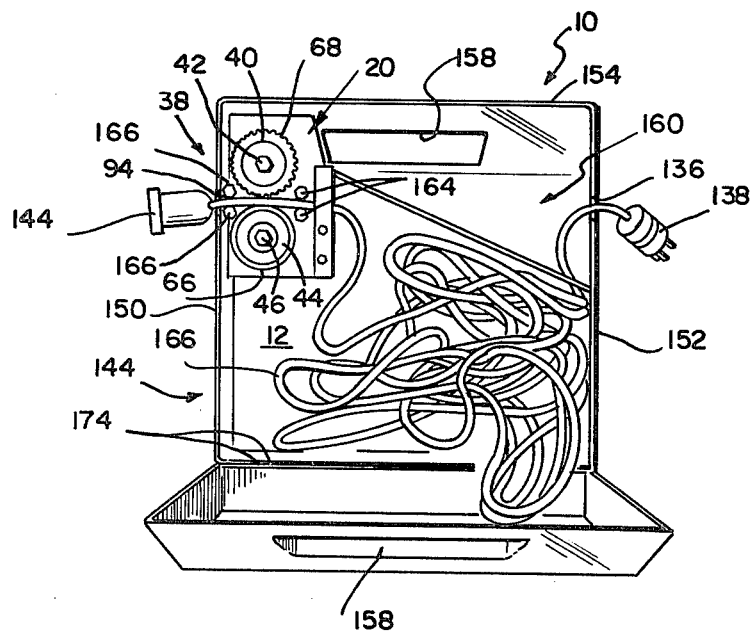
FIG. 9 is a side elevational view of the apparatus of FIG. 7, the apparatus being illustrated in the open position.

Turning now to the embodiment of the invention illustrated in FIGS. 7-9, those elements numbered identically with the elements in the embodiments of FIGS. 1-6 perform the same or similar functions.

In the embodiment of FIGS. 7-9, an apparatus 10 includes a case 144 having generally rectangular side walls 146, 148, end walls 150, 152 and a top 154 and bottom 156. Case 144 includes a built-in handle 158. The interior 160 (see FIG. 9) of case 144 is divided generally into a storage portion 12 and a retrieval mechanism support portion 20. The retrieval mechanism support portion 20 houses a retrieval mechanism 38 including a wheel 40 support for rotation upon an axle 42, and a wheel 44 supported for rotation on an axle 46. One end 50 of axle 42 extends outwardly through an upper corner of side wall 146. A hand crank 108 is attached to end 50 of axle 42.

An opening 94 (FIG. 9) is provided in end wall 150, and an opening 136 is provided in end wall 152. In this embodiment, wheels 40, 44 are not shiftable toward and away from one another to engage the elctrical cord 106 therebetween. Rather, the electrical cord, which in the instant embodiment is a relatively flat flexible cord, is engaged between the peripheries 66, 68 of wheels 44, 40, respectively, by removing a guide strip 162, inserting the electrical cord 106 thereunder, and replacing the guide strip 162. The electrical cord 106 of the embodiment of FIGS. 7-9 runs between a pair of guide heads 164, between the peripheries 66, 68 of wheels 44, 40 and between a pair of guide heads 166 as it enters or leaves the storage portion 12 of case 144. The closely spaced-apart generally cylindrical surfaces of the guide heads 164, 166 prevent electrical cord 106 from entering the storage space 12 with any twists. This is done to minimize the possibility of knotting or tangling which might otherwise result from the retrieval of electrical cord 106 and storage of the cord in the storage portion 12 of the case.

As best illustrated in FIG. 9, case 144 is divided into two substantially equal portions 170, 172 joined by a hinge (not shown) along their bottom edges 174. This configuration allows access to the interior of case 144 to load the electrical cord 106 into the case and, if desired, to remove cord 106 from the case. The male end 138 of cord 106 extends through the opening 136 provided in end wall 152. The female end 140 of cord 106 extends through the opening 94 provided in wall 150 of case 144.

To remove any length of cord 106 from case 144, the female end 140 of the cord is pulled from the case through opening 94. As cord 106 is removed, of course, hand crank 108 turns (counterclockwise in FIG. 7), since the peripheries 66, 68 of wheels 44, 40, respectively, continuously engage the surface of cord 106. To retrieve the cord, crank 108 is turned (clockwise in FIG. 7). Friction of the peripheries 66, 68 of wheels 44, 40, respectively, against the surface of cord 106 returns the cord 106, free of twists, to the storage portion 12 of case 144.

In this embodiment, the periphery 66 of wheel 44 is generally flat. The periphery 68 of wheel 40 is serrated to grip the cord 106 surface more securely. In the illustrated embodiment, the periphery 66 of wheel 44 is coated with a soft, rubber-like material to provide better frictional engagement between wheel 44 and the surface of the cord. In this embodiment, wheel 44 turns freely on its axle 42, rather than being driven from the hand crank 108 through a pulley-and-belt arrangement such as that of the embodiment of FIGS. 1-6.

In a third embodiment of the invention, illustrated in FIGS. 10-12, those elements numbered identically with the elements in the embodiments of FIGS. 1-6 and 7-9 perform the same or similar functions.

In the embodiment of FIGS. 10-12, the apparatus 10 includes a case 200 which is somewhat trapezoidal prism shaped with rounded corners, a flat, generally rectangular bottom 202 and a contoured top 204. As with the cases 12, 144 of the preceding embodiments, case 200 can be manufactured from any suitable material. Desirably, case 200 is molded from a high-impact plastics composition. Further, and as best illustrated in FIG. 11, case 200 is blow-molded in one piece with a pair of perimetral ridges 206, 208 separated by a vertically extending non-tapered connector section (not shown). During the assembly of case 200 with its components, the connector section is removed from between the perimetral ridges 206, 208, and the contoured top portion 204 of the case is joined to the bottom and side wall portions 210 thereof by snapping engagement of perimetral ridges 206, 208. The case 200 can be assembled with a suitable adhesive to prevent separation between ridges 206, 208 or, the plastics composition can be of a sufficiently resilient nature that the top 204 and bottom and side wall portions 210 can be snapped together and later separated for any desired purpose. For example, it may be desirable to maintain only one top portion 204 with several different bottom and side wall portions 210 having varying capacities, or different contents. The same top portion 204 could then be used as a retrieval mechanism for, for example, a 50 foot electrical cord, a 25 foot garden hose, and 200 feet of rope.

Turning now to the specific structure housed within the top portion 204, a first wheel 220 provided with an axle 222 is rotatably supported in an upper forward portion of top portion 204. Axle 222 extends from both the right- and left-hand sides 224, 226 of case 200. The material from which case 200 is formed is somewhat self-lubricating. Thus, no special bearings are provided between the axle 222 and the top portion 204. Further, the material from which the case 200 is constructed is sufficiently supportive to withstand the load placed on the material surrounding the openings 228 by axle 222, so no additional structure is required around the aligned openings 228 in top portion 204 through which axle 222 extends. Depending upon the material used in the construction of case 200, it may be desirable to provide supporting bosses, or a supporting web of material, or some other support structure around openings 228.

The top portion 204 of case 200 is formed to provide a carrying handle 230. Forwardly from carrying handle 230, and in the side of the housing portion 218 for the first wheel 220, a pair of slots 232 are formed in the housing portion 218 side wall. A trigger member 234 is pivotally mounted on the top portion 204 adjacent, and directly overlying, the handle 230. The trigger member 234 includes two depending ear portions 236 which pivotally engage the top 204 adjacent handle 230. Desirably, this pivotal engagement is achieved by providing aligned apertures 240 in ears 236 and circular cross-section projections 242 on top 204.

Trigger 234 includes a bifurcated forward portion providing a pair of arms 244 which extend through slots 232 into the interior of the forward housing portion 218. Arms 244 extend longitudinally forward, one arm 244 on each of the axially extending sides 246 of the first wheel 220. Adjacent the forward wall 248 of top portion 204, a molded plastic yoke 250 is pivotally mounted on the distal ends 252 of arms 244. Yoke 250 includes two vertically extending yoke arms 254 and a lower distal connecting portion 256 connecting the vertically lower end of arms 254. The upper ends of arms 254 are pivotally mounted to the distal ends 252 of arms 244 by providing in distal ends 252 aligned apertures 260. Projections 262 provided on the outwardly facing sides of arms 254 snap into engagement in the apertures 260 to support the yoke 250 from the handle 230.

A second smaller wheel 264 is mounted for revolution on its axis defined by axially extending projections 266 on wheel 264. Projections 266 snap into engagement with aligned apertures 268 in arms 254 between the vertically upper ends thereof and the vertically lower end connecting member 256. While the second wheel 264 illustrated is peaked at 270 at its longitudinal center, it should be understood that different axial section profile wheels can be provided, depending upon the flexible element to be retrieved by the apparatus of FIGS. 10-12. The illustrative flexible element is a generally flat, two-conductor electrical cord 272.

Passageways 274, 276 are provided in the forward wall 248 and rearward wall 278, respectively, of top portion 204. As best illustrated in FIG. 10, the male plug 280 of cord 272 projects through the rearward wall opening 276 for access thereto by electrical service. The female plug 282 of cord 272 is threaded between the peripheries of wheels 220, 264 and extends from case 200 through opening 274.

To dispense the cord 272, the handle 230 is in its position illustrated in solid lines in FIG. 11, permitting the length of cord 272 to pass freely between the peripheries of wheels 220, 264 and through opening 274 from case 200. Any desired length of cord 272 can, of course, be removed from the case 200 simply by pulling on the female plug 282 end of cord 272. To retrieve the dispensed length of cord 272, an operator depresses trigger member 234 to the position illustrated in broken lines in FIG. 11. This urges yoke 250, and the second wheel 264 supported thereby, vertically upwardly toward engagement of the wheel 264 periphery with the periphery of wheel 220. The cord 272 is captured between the peripheries of the wheels, preventing their engagement. However, the disposition of the cord 272 between the wheel 220, 264 peripheries pivotally urges the yoke 250 forward as illustrated in broken lines in FIG. 11, until the connecting portion 256 of yoke 250 lies firmly against the inside of forward wall 248 of the top portion 204. With the yoke in this position, the second wheel 264 has risen vertically as high as it can go in the housing and is held tightly with its periphery upwardly against the cord 272. With his free hand, the operator unfolds the hand grip portion 284 of a collapsible molded plastic crank handle 286 until the rearward extent 288 of hand grip portion 284 snaps into position in a notch 290 provided in the crank portion 292 of crank handle 286. This downward or outward position of the hand grip portion 284 is illustrated, fragmentarily, in broken lines in FIG. 12. The operator then cranks the handle 286, turning it to drive the wheel 220 in a direction (clockwise in FIG. 11) to retrieve the cord 272. When the female plug 284 has reached the opening 274, the cord 272 is fully retracted and stored in the bottom housing portion 210 of case 200.

As best illustrated in FIG. 12, the crank portion 292 of crank handle 286 is provided with a passageway including an upstanding resilient key portion 296. Each end of axle 222 is provided with a corresponding notch 298. The crank handle 286 can thereby be resiliently snapped into position on either the right hand side 224 or the left hand side 226 of axle 222, as is most convenient for operation by the operator.

The winder for flexible elements, illustrated by the three disclosed embodiments, incorporate a number of features which are desirable in many fields. First, on a flexible element having first and second ends which are different, it may be desirable to withdraw one or the other end from the dispensing apparatus and maintain the other end substantially stationary. The disclosed embodiments will accept, for example, garden hose and electrical cord such that either the male end or the female end can be pulled from between the winding wheel. As has been discussed, the winding and storage mechanism of the instant invention can be made to accept flexible elements having substantially any cross sectional shape. The winders can be constructed to crank from either the right- or left-hand side. Further, the winding mechanism can be motorized as, for example, by a small electric motor. The mechanism of the instant invention will accept different lengths of flexible elements, provided there is enough space in the storage compartment to accommodate the length of flexible elements used. When used in connection with electrical cords, there is no heat build-up due to current through the cord, as there frequently is when such an electrical cord is wound about a cylinder or spool, as in several prior art structures. The structures of the instant invention keep "flat" cross-sectional flexible elements from twisting, knotting and jamming the winding mechanism.

What is claimed is:

1. An apparatus for retrieving and storing a flexible element having first and second ends, the apparatus comprising means for retrieving the flexible element and means for providing storage of the retrieved flexible element, the retrieving means including at least one wheel, means for holding the flexible element frictionally against the periphery of the wheel, means for supporting the wheel for rotation about its axis, and means for turning the wheel in a direction to cause retrieval of the flexible element between the wheel periphery and the holding means, the support means including means for shifting the holding means from a use orientation to a slip-providing orientation in which the frictional engagement between the periphery of the wheel and the flexible element is released to provide for withdrawal of the flexible element from the storage means between the wheel periphery and the holding means, the shifting means including a trigger member and a yoke member actuable by the trigger member, the holding means being supported from the yoke member, the yoke member having a slip-providing position in which the holding means is out of frictional engagement with the elongated member, and a flexible element retrieval position in which the holding means is held in frictional engagement with the flexible element.

2. The apparatus of claim 1 wherein the means for holding the flexible element frictionally against the periphery of the first-mentioned wheel comprises a second wheel supported for revolution about its axis from the yoke member, the axes of the first-mentioned wheel and second wheel extending generally parallel to one another.

* * * * *